March 12, 1935.  T. HALSALL ET AL  1,994,278
APPARATUS FOR THE MANUFACTURE OF RUBBER SOLE FOOTWEAR
Filed Sept. 14, 1933    2 Sheets-Sheet 1

March 12, 1935.  T. HALSALL ET AL  1,994,278
APPARATUS FOR THE MANUFACTURE OF RUBBER SOLE FOOTWEAR
Filed Sept. 14, 1933  2 Sheets-Sheet 2

INVENTORS.
Thos Halsall
John Prior

Patented Mar. 12, 1935

1,994,278

UNITED STATES PATENT OFFICE 1,994,278

APPARATUS FOR THE MANUFACTURE OF RUBBER SOLE FOOTWEAR

Thomas Halsall, Middleton, and John Prior, Rochdale, England

Application September 14, 1933, Serial No. 689,368
In Great Britain October 7, 1932

2 Claims. (Cl. 18—17)

The invention relates to apparatus for the manufacture of rubber-sole footwear of the type in which a sole-plate and mould are mounted on a hot table the upper part of the mould being divided vertically to move horizontally to permit of the insertion and removal of the last carrying the shoe, pressure being applied to the last by a lever or otherwise to force it against the sole-plate.

According to the invention the apparatus comprises a table, a mould secured thereto divided to open horizontally, a last to carry the shoe upper mounted on a downwardly sliding spindle by which it is positioned within the mould in combination with an adjustable sole-plate within the mould mounted on an upwardly sliding spindle, and means to raise and force the sole-plate upwards through the mould against the last and compress the uncured rubber sole between it and the last.

The invention will be fully described with reference to the accompanying drawings:—

Figure 1:
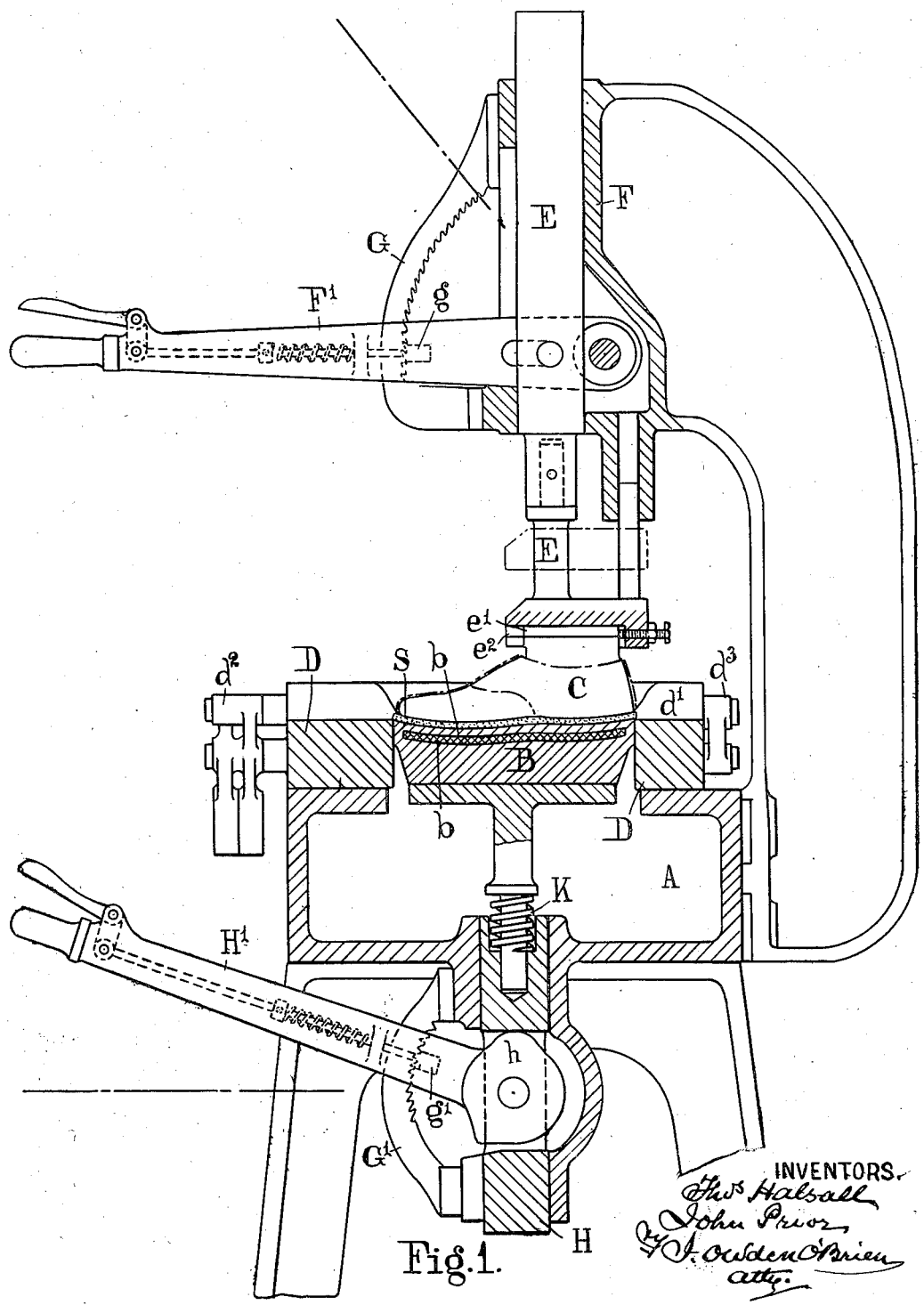
Fig. 1 is a longitudinal sectional elevation of the apparatus.
Figure 4:
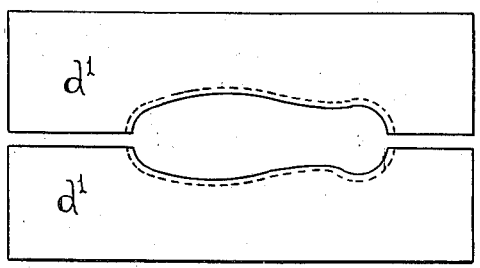
Fig. 4 is a detail plan of members $d^1$ $d^1$ of upper part of mould.
Figure 5:
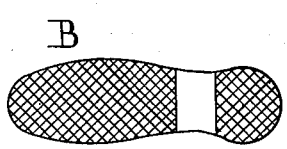
Fig. 5 is a plan of sole-plate B.
Figure 6:
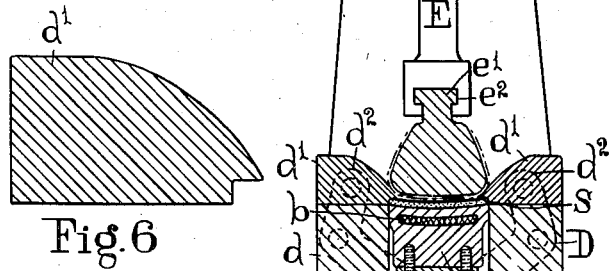
Fig. 6 is an enlarged section of member $d^1$ of mould D.
Figure 3:
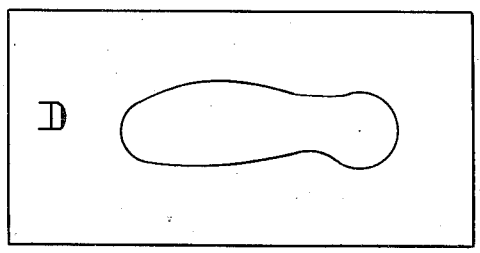
Fig. 3 is a detail plan of lower part of mould D.
Figure 2:
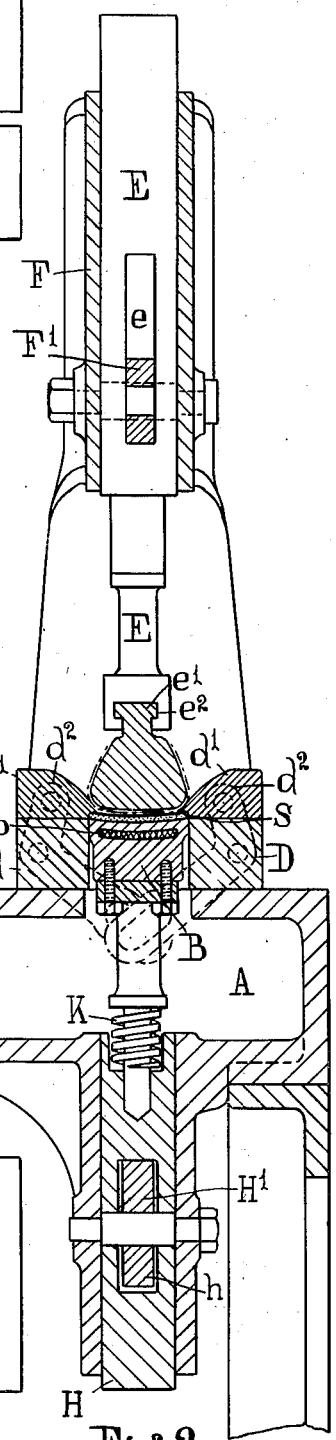
Fig. 2 is a transverse sectional elevation.

The table A is of known construction and may be heated by electricity, gas or steam as may be found most convenient or the sole-plate B alone may be heated by an electric resistance $b$ inserted therein.

The mould D secured to or mounted on the table A is constructed of upper and lower parts $d$ $d^1$ the lower part $d$ being fixed to the table and the upper part $d^1$ divided to open horizontally to allow the last to enter. The inner edges of the movable parts $d^1$ of the mould are shaped to enter and close around and over the welt line of the shoe on the last C to shape the welt line and prevent upward spreading of the rubber of the sole under pressure during the curing process.

The sides $d^1$ $d^1$ of the upper part of the mould are pivoted to the lower part $d$ by cranked levers $d^2$ at one end and by links $d^3$ at the other end to move in a lateral direction to release the last and finished shoe.

The cranked levers $d^2$ are moved by a pedal, lever, or spring (not shown).

The last C to carry the shoe upper is removably mounted on upright spindle E adapted to move or slide vertically. The spindle E is mounted in a housing F through which it slides and is forced downwards to bring the last and shoe upper into position in the mould D by an eccentrically pivoted lever $F^1$ (or by a cam or eccentric) passing through a slot $e$ cut in the spindle E. Or a lever or cam may be disposed to act against the end of the spindle E. The lever F is held depressed against the upward pressure of the sole plate B by fixed ratchet teeth G and a pawl $g$ on the lever.

The last C is detachably affixed to the vertical spindle E by a shank with a T head $e^1$ (or other suitable shape) fitting into a T or key slot $e^2$ in the end of the spindle E.

The sole plate B is removably mounted within the mould D upon an upwardly sliding spindle H and is raised or forced against the last by a cam or eccentric $h$ and lever $H^1$. The spindle H is divided transversely, a buffer compression spring K being interposed between the two parts to impart a continuing movement or pressure to the sole plate against the rubber sole as it contracts after the initial pressure has ceased and also to equalize pressure with variation of thickness of rubber in the sole during curing. When pressure is applied the lever $H^1$ is held in position and pressure maintained by fixed ratchet teeth $G^1$ and a pawl $g^1$ on the lever.

The vulcanizing and curing of the rubber sole S in position on the upper are effected by heat and pressure while the last is in the mould.

What we claim as our invention and desire to protect by Letters Patent is:—

1. Apparatus for the manufacture of rubber-soled footwear comprising a fixed heated table, a mould secured thereto divided to open horizontally, a last to carry the shoe upper mounted on a downwardly sliding spindle by which it is positioned within the mould in combination with an adjustable sole-plate disposed within the mould, an upwardly sliding spindle upon which the sole plate is mounted and means to raise and force the sole-plate upwards through the mould against the last to hold and compress the uncured rubber sole between it and the last.

2. Apparatus for the manufacture of rubber-soled footwear comprising in its construction a stationary fixed heated table, a mould secured thereto divided horizontally within which to shape the sole to the upper of the shoe, levers to open the divided mould to receive the shoe upper upon a last, a last to carry the shoe upper by which it is positioned in the mould, a downwardly slidable spindle to which the last is attached, a lever and ratchet by which the spindle and last are moved downward and held in position, an adjustable sole-plate disposed within the mould and adapted to be moved upwards therein, an upwardly slidable spindle upon which the sole plate is mounted and a lever and cam by which the sole plate is raised and forced upwards against the last to compress and hold the sole between it and the last during the process of vulcanization.

THOMAS HALSALL.
JOHN PRIOR.